(12) United States Patent
Mezza

(10) Patent No.: US 7,576,145 B2
(45) Date of Patent: Aug. 18, 2009

(54) METHOD FOR PRODUCING DEGRADABLE POLYMERS

(75) Inventor: Michel Mezza, Vendat (FR)

(73) Assignee: Plasbio, Inc., Saint-Henri-De Levis, Quebec (CA)

( * ) Notice: Subject to any disclaimer, the term of this patent is extended or adjusted under 35 U.S.C. 154(b) by 26 days.

(21) Appl. No.: 10/833,068

(22) Filed: Apr. 28, 2004

(65) Prior Publication Data

US 2005/0245638 A1 Nov. 3, 2005

(51) Int. Cl.
*C08K 5/092* (2006.01)

(52) U.S. Cl. .................... 523/124; 524/18; 524/19; 524/27; 524/47; 524/54; 524/56; 524/58; 524/72; 524/300; 524/304; 524/415; 524/416; 524/417; 524/424

(58) Field of Classification Search ............ 523/124; 524/18, 19, 27, 47, 54, 56, 58, 72, 300, 304, 524/415, 416, 417, 424, 124
See application file for complete search history.

(56) References Cited

U.S. PATENT DOCUMENTS

| 5,252,271 | A |   | 10/1993 | Jeffs |         |
|-----------|---|---|---------|-------|---------|
| 5,863,991 | A | * | 1/1999  | Warzelhan et al. | 525/426 |
| 6,372,844 | B1 | * | 4/2002 | Shinoda et al. | 525/63 |
| 6,878,199 | B2 | * | 4/2005 | Bowden et al. | 106/162.5 |

FOREIGN PATENT DOCUMENTS

| DE | 102 30 776 | 2/2004 |
| EP | 1 591 216 | 4/2005 |
| FR | 2 846 273 | 10/2002 |
| WO | WO 03/008480 | 1/2003 |

* cited by examiner

*Primary Examiner*—Kriellion A Sanders
(74) *Attorney, Agent, or Firm*—Bachman & LaPointe, P.C.

(57) ABSTRACT

The present invention relates to a composition for producing naturally-degradable substitutes of plastics and to a method for producing a granular combination of naturally-degradable polymers suitably usable in the plastic transformation industry.

17 Claims, No Drawings

METHOD FOR PRODUCING DEGRADABLE POLYMERS

BACKGROUND OF THE INVENTION (a) Field of the Invention

The present invention relates to a composition for use in the production of naturally-degradable polymer products which preferably comprises polycaprolactone (PCL), malic acid (MA) and polyethylene glycol (PG). The present invention also relates to a method for producing a composition in the form of tablets for use in the production of naturally-degradable polymer products.

(b) Description of Prior Art

Plastics are being used virtually everywhere and have become an almost indispensable part of everyday life. Some are permanent objects, intended for a long-term use. Others, actually a major portion of plastics population, are found as short-term or single-use articles and include bags, wrappings, containers, bottles, pens, etc. The extensive use of plastics therefore leads to the consequence that plastic residues are found all over the planet, potentially harming wildlife and littering the remotest places.

The majority of ordinary plastic products will remain for centuries or more, since they are composed of huge and unbreakable molecular polymer chains. Indeed, the plastic transformation industries traditionally use, as primary matter, mixtures of extruded plastics chips with additives, which are transformed in objects, such as bags, films, bottles, containers, etc. through blowing, extrusion, milling or injection (these mixtures have been homogenized through heating and extrusion).

To minimize the problems of pollution by plastics, recycling of all plastic products would be ideal. However, such a complete recycling of plastic material is difficult to achieve, since recycling facilities are not available everywhere or are too remote and the population compliance too poor to be cost effective. Then emerges a need to find biodegradable substitutes.

Biodegradable plastic substitutes (BPS) are substances that can be used as conventional plastics, while decomposing on disposal into water and carbon dioxide, by the action of microorganisms commonly present in the natural environment. The BPS can therefore be returned to nature since they would decompose quickly and do not adversely affect the quality of the compost produced in composting facilities.

BPS known in the prior art are natural biopolymers, modified biopolymers or chemically synthesized polymers, and include poly 3-hydroxybutyrate, modified starch, cellulose acetate polybutylenesuccinate, polybutylenesuccinate/adipate, polycaprolactone, polylactic acid and polyvinyl alcohol. These compounds and many other propositions of the industry are actually not fully satisfying plastic substitutes, either because of their poor strength, poor compliance with existing transforming devices, or because they actually are bio-fragmentable—in a myriad of tiny plastic parts or powder-instead of being biodegradable. Polylactic acid derivatives and polyhydroxybuturates are very expensive and their use is therefore restricted mainly to medical purposes, such as resorbable sutures. Polyvinyl acid is decomposed only by water and is used mainly in washing machines detergent pouches. Polytetramethyleneadipate, polybutyleneadipate and polycaprolactone modified with starch-based polymer (Mater-BI) are appropriate for producing films and bags, but not for products obtained by plastic injection. Propositions derived from maize and starch alone may have poor physical qualities and appear to easily clog existing transforming machines. The existing BPS do not meet the requirements for plastic injection and the time required for the degradation of these existing products cannot be adjusted to consumers' needs.

A solution proposed to alleviate the above-described problems related to BPS, consists in the use of BPS mixes. Indeed, the use of a biodegradable polymer combination could enhance the chemical and physical properties of the product produced therefrom. BPS mixes should likely be required to have a granular or chip-like form, since the use of a powder mix is not convenient for the plastic industry machinery, that requires granular or pelletized materbatch. However, mixtures of powders having a wide range of molecular, such as those required in the composition of optimal BPS mixtures, do not tend to produce an homogenous product. Moreover, BPS are not easily pelletized by conventional extrusion process of the plastic industry, since this process requires high temperatures and BPS are, for the majority, not thermostable nor thermoresistant to such extrusion high temperatures.

Therefore, it would be highly desirable to be provided with a method for producing a masterbatch that avoid conventional extrusion while leading to a composition of totally biodegradable BPS, having physical characteristics similar to those of traditional masterbatches, and capable of being transformed by the same industrial equipment. It would also be highly desirable to be provided with a BPS composition at a reasonable cost, and giving an homogenous product, that can be stocked for an extended period time and have a range of degradation time according to specific needs.

SUMMARY OF INVENTION

One object of the present invention is to provide a method for producing a naturally-degradable polymer composition in the. form of tablets, for use in the production of plastic substitute products, the production of plastic substitute products being carried out using machinery used for the production of non-naturally-degradable plastic products. The method of the present invention comprises compacting at least one naturally-degradable polymer in powder form and substantially free of non-naturally degradable plastic material, the compacting being carried out at a temperature below 100° C. using a press, under conditions to obtain the composition tablets.

Another object of the present invention is to provide a composition for use in the production of naturally-degradable polymer products, this composition comprising 10% to 85% polycaprolactone (PCL), 2% to 30% malic acid (MA) and 10 to 85% polyethylene glycol (PG).

For the purpose of the present invention, the term "naturally-degradable" is intended to mean biodegradable, biocompatible, hydrodegradable, lightdegradable, compostable or degradable into simple elements that do not accumulate into nature and participate to natural cycles.

The terms "plastic", "non-degradable plastic" or "non-degradable polymers" are intended to mean a synthetic matter composed of huge and unbreakable molecular polymer chains that is bioinert and tends accumulate into nature.

The term "tablet" is intended to mean a pellet, a capsule, a granule, a chip, a grain, a kernel, a particle and the like.

DESCRIPTION OF PREFERRED EMBODIMENTS

As mentioned above, according to the present invention, there is provided a composition that comprises at least one naturally-degradable polymer in powder form. The pelletization or tablet formation of the naturally-degradable polymeric powder by the method according to the invention gives tablets that are suitable for the industry of polymer or plastic transformation, which mainly requires masterbatches in tablet form. The composition in powder form that is pelletized by the method of the present invention includes, but is not limited to, PCL, MA and PG alone or in combination. The method of the present invention is however preferably used to produce tablets from a combination of naturally-degradable polymers in powder form, and more preferably a combination that comprises PCL, MA and PG, since one of the major problems encountered in the production of plastic substitutes from a combination of naturally-degradable polymers derives from the discrepancy of the molecular weights of the individual powders used therein, resulting in a difficulty of obtaining an homogenous mix of powders and therefore, a less homogenous product. The tablet-like mixes can be used with existing transforming apparatuses encountered in the industry such as extrusion, milling, blowing or injection machines or devices. Other advantages obtained by granulating the composition according to the invention include easy production, mix precision, and lower working temperature. A person skilled in the art will understand that the method of the present invention is not limited to the production of tablets from the composition described herein-above and that it may be used to produce tablets from any composition of any suitable naturally-degradable plastic substitute in the form of powder.

The compacting of the naturally-degradable polymer powders or polymer mixtures in tablet form is preferably performed by cold-compression or hot-compression, more preferably at a temperature below 100° C., and even more preferably at room temperature, to avoid any chemical change in the chemical structure of the naturally-degradable polymer. In order to succeed in properly mixing the formulation and additives that may be present therein, a high-pressure tablet compressing machine, such as used for tablet-making in the pharmaceutical industry, either of the rotary or of the alternative type, can be used to exert a pressure ranging from 1 to 30 tons on the powder composition, to produce tablets therefrom. The use of a high pressure tablet-forming machine for combining the ingredients of a mix needed for the plastic transformation industry, whether the mix is biodegradable or not, constitutes an embodiment of the present invention. A person skilled in the art will however understand that any compression method that preserves the physical and chemical properties of the polymer composition may be used to produce tablets from the components of the composition according to the invention.

It is another embodiment of the present invention to provide a composition for use in the production of naturally-degradable polymer products which comprises 10% to 85% polycaprolactone (PCL), 2% to 30% malic acid (MA) and 10% to 85% polyethylene glycol (PG), and more preferably between 20% to 60% PCL, 5% to 20% MA and 20% to 60% PG. The composition of the present invention can be obtained in the form of a powder, without compression, to be used with specialized double-screw feeding plastic transformation machines. However, it is a preferred embodiment of the present invention to provide a composition that comprises PCL, MA and PG in the form of tablets.

The additives used for the purpose of the present invention may be used either alone or in combination, in varying proportions, and include, but are not limited to, lignins and their derivatives, flours (wheat, maize, soja, chesnut), metals (boron, iron, molybdenum, zinc, magnesium, calcium, phosphate), dephosphorisation ashes, wood sawdust, torrefied come, sphalgm, pectins, dextrose, gelatins, fructose, maltose, wheat soramides, carboxymethylcelluloses, polyacrylamides, alginates (sodium, calcium, potassium, ammonium), polycaprolactones, polylactides, oxepanone derivatives, aspartame, adipates (potassium, sodium), oxidized starches, gluconates (sodium, potassium, calcium), guanylates (sodium, potassium, calcium), glycerol, beta-carotene, proprionates (calcium, potassium, sodium), stearates (calcium, magnesium, sodium), polyethylene glycol, fatty amides, sulfates (calcium, potassium, sodium, ammonium, manganese, iron), chlorides (calcium, potassium, ammonium, magnesium, iron), acetates (calcium, potassium, sodium, ammonium, manganese, iron, saccharose iso-butyrate), benzoates (calcium, potassium, sodium, ammonium), carbonates (calcium, potassium, sodium, ammonium, magnesium, iron), bicarbonates (potassium, sodium, ammonium), phosphates (calcium, potassium, sodium, ammonium, magnesium, iron, aluminum, cellulose, starches), citrates (calcium, potassium, sodium, ammonium), nitrates (calcium, potassium, sodium, ammonium, magnesium), calcium glycerophosphate, oxydes (calcium, potassium, magnesium, iron, polyethylene), calcic cyanamide, hydroxides (calcium, potassium, sodium, ammonium, magnesium), lactates (calcium, potassium, sodium, magnesium, iron), magnesium hydrocarbonate, latex, saccharose, ammonium sulfonitrate, urea, agar-agar, acids (gluconic, nucleic, aminate, fatty acids, stearic, polyacrylic, lactic, glycolic, malic), starch (maize, manioc, barley, rye, oat, sorgho, wheat, peas, rice, potatoes, palm trunk, acorn, bean, chesnut), glucose, sulfur, iodine, gums (adragante, arabic, guar, konjac, gellane, karaya, tara, xanthane), lecithines, gluten, waxes (camauba, candefilla, bee), lactose, levulose, yeasts, cellulose and its derivatives, chitin and its derivatives and seaweeds.

The naturally-degradable polymer of the invention may be degraded by micro-organisms in aerobic and/or anaerobic conditions (biodegradable), by water (hydro-degradable) or by light (photodegradable), according to the nature of the naturally-degradable polymers used to produced the combination material, to the additives or a combination thereof.

The polymer of the present invention may serve many uses that include agricultural uses such as mulching, shading, weed-control, ground-cover growing films, pots for transplanting; planting aids and clamps, protective sheets and nets for tree planting in deserts or nordic areas, fishing lines, fishery materials and nets and slow release material for fertilizers and agrochemicals. The present invention can further be used in the food industry for food packaging, trays for perishables, packages for instant and fast food, dispensing machine trays, bottling industry, grocery bags, plastic utensils, cups, covers, corks or vegetable mesh. The airlines industry may use the present invention for wrappings, cushions, utensils, cups and trays. The degradable composition of the present invention can be used in civil engineering as construction material for heat insulators, form wares, retaining walls and bags and for domestic uses such as garbage bags or leaf recycling bags. Cosmetic/hygienic products such as diapers, Q-tips, sanitary napkins, disposal razors, tooth brushes, bottles, golf tees, disposable goods used in fishing, hunting, marine sports, golf, hiking and mountain climbing, disposable goods for parks and sporting, sports-watching food/drink packaging, rifle cartouches, pyrotechnics bags, pens, markers, low melting temperature adhesives for packaging. and book-binding and ink cartridges may also be obtained according to the present invention. Finally, the present invention may find uses in the medical field as slow release material for drugs; suture threads, bone fixation, films, non-woven fabrics, syringes, thermometer covers; ear and throat examining accessories and disposable sheetings. A person skilled in the art will understand that any product suitably made from any plastic or polymer.can be produced using the product of the present invention.

The present invention will be more readily understood by referring to the following examples which are given to illustrate the invention rather than to limit its scope.

EXAMPLE I

Characterization of a Plastic Substitute Produced from a Naturally-Degradable Polymer Compositon.

A plastic substitute product was produced using a composition comprising polycaprolactone, malic acid and. polyethylene glycol, according to protocols of the traditional industry of plastic production, to determine its physical and chemical properties. The components of the tested composition and their proportions are listed in Table 1.

TABLE 1

Components and their proportion in a tested composition of naturally-degradable polymers.

| Component | Proportion In masterbatch (%) |
|---|---|
| Malic Acid | 5 |
| Polyethylene Glycol | 30 |
| Polycaprolactone | 30 |
| Lignin | 10 |
| Calcium carbonate | 10 |
| Tricalcic phosphate | 15 |

Results

The product obtained with the tested composition is totally biodegradable, rather than degrading in tiny or microscopic plastic chips, and has the qualities such as strength, resistance, flexibility, colorable if desired, food-quality if desired, etc, similar to those required by the industry of plastic products. In addition, the tested composition can be transformed in BPS products using the same industrial equipment of the traditional industry of plastic transformation, such as extruders, injectors, milling gear and blowers. The lower working temperature for transformation is energy saving and the resulting product is cost reasonable. The product is stockable for an extended period of time (given appropriate conditions) until use and eventual degradation/composting conditions. The fact that the formulation of the composition may be adapted to the need of the customer allows a wide range of degrading time, either short (days) or long (months). The particular composition of the resulting product makes it biodegradable by micro-organisms, in aerobic and/or anaerobic conditions, and/or photodegradable (by UV light), and/or hydro-degradable (water), and suitable for the plastic transformation industry standards and equipment. Therefore, the tested composition meets the ideal requirements for biodegradable plastic substitutes.

EXAMPLE II

Industrial Production Using a Naturally-Degradable Polymers Composition

To assess the suitability of a naturally-degradable polymers composition to be used in the production of domestic goods, the composition described in Table 1 was used to produce cups, according to protocols used in the industry of plastic transformation, by plastic injection. The composition listed in Table 1 was compressed in a pharmaceutical tablet pressing machine to obtain 6 millimeters-diameter tablets. The tablets obtained were then fed in an injection press to produce the cups, according to the injection parameters listed in Table 2. The required characteristics of the injection product were adjusted to give cups of food-quality, having a weight of 55 grams, a 1.4 millimeters thickness, and capable of being biodegraded in six (6) weeks.

TABLE 2

Parameter of the injection process

| | |
|---|---|
| Identification: | Biodegradable Polymer |
| Quality: | Food-quality |
| Molecular weight: | 47500 |
| Density: | 1.1 |
| Weakening temperature: | 58-60° C. |
| Fusion temperature (use): | 110-115° C. (decomposition at 200° C.) |
| Flash point: | 275° C. |
| Viscosity (Mpa): | 17.5 |
| Melt Flow Index (at 190° C.): | 28 |
| INJECTION: | |
| Temperature zone 01 (feeding): | 100° C. |
| Temperature zone 02: | 110° C. |
| Temperature zone 03: | 120° C. |
| Temperature zone 04(injector): | 120° C. |
| Holding pressure: | NO |
| Screw rotation: | Slow (100 tr/mn) |
| Screw length: | 15 à 26 diameters |
| Colding mold temperature: | 15° C. (tap water) |
| Injection speed: | 30% |
| Injection pressure: | 40 bars |

Results

The tested composition is suitable for use producing equipment that is normally obtained in the industry of. Results of the injection using the composition showed that 1.4 mm-thick cups produced according to the process of the present invention do not present any risk for the environment. The risks associated with skin contact, ingestion or inhalation are negligible. Cups were composted in laboratory facilities and totally biodegraded in 6 weeks as safe residues for the environment.

While the invention has been described in connection with specific embodiments thereof, it will be understood that it is capable of further modifications and this application is intended to cover any variations, uses, or adaptations of the invention, following, in general, the principles of the invention, and including, such departures from the present disclosure as come within known or customary practice within the art to which the invention pertains and as may be applied to the essential features hereinbefore set forth, and as follows in the scope of the appended claims.

I claim:

1. A composition for use in the production of naturally-degradable polymer products, comprising: 5% to 85% homopolymers of polycaprolactone, 10% to 85% polyethylene glycol, and 2% to 30% malic acid.

2. The composition of claim 1, wherein the naturally-degradable polymer products are plastic substitute products.

3. The composition of claim 1, further comprising an additive.

4. The composition of claim 3, wherein said additive is intended to contribute to modulate degradation time, strength, thickness, color, production parameters or combination thereof of the naturally-degradable polymer products.

5. The composition of claim 1, wherein the composition is in a tablet form.

6. The composition of claim 1, wherein the composition is in a powder form.

7. A composition for use in the production of naturally-degradable polymer products, comprising: 20% to 60% homopolymers of polycaprolactone, 20% to 60% polyethylene glycol, and 5% to 20% malic acid.

8. The composition of claim 7, further comprising an additive.

9. The composition of claim 8, wherein said additive is intended to contribute to modulate degradation time, strength, thickness, color, production parameters or combination thereof of the naturally-degradable polymer products.

10. The composition of claim 7, wherein the composition is in a powder form.

11. The composition of claim 7, wherein the composition is in a tablet form.

12. The composition of claim 7, wherein the naturally-degradable polymer products are plastic substitute products.

13. A composition for use in the production of naturally-degradable polymer products, comprising: 5% malic acid, 30% polyethylene glycol, 30% polycaprolactone, 10% lignin, 10% calcium carbonate, and 15% tricalcic phosphate.

14. A composition for use in the production of naturally-degradable polymer products, comprising: 5% malic acid, 30% polyethylene glycol, 30% polycaprolactone, 10% lignin, 10% carbonate comprising any one of the following: calcium, potassium, sodium, ammonium, magnesium and iron, and 15% phosphate comprising any one of the following: calcium, potassium, sodium, ammonium, magnesium, iron, aluminum, cellulose and starches.

15. A composition for use in the production of naturally-degradable polymer products consisting of: 5% to 85% homopolymers of polycaprolactone, 10% to 85% of polyethylene glycol, and 2% to 30% of malic acid, and at least one derivative selected from the group consisting of lignins, lignin derivatives, flours, metals, dephosphorisation ashes, wood sawdust, torrefied come, sphaigm, pectins, dextrose, gelatins, fructose, maltose, wheat soramides, carboxymethylcelluloses, polyacrylamides, alginates, polycaprolactones, polylactides, oxepanone derivatives, aspartame, adipates, oxidized starches, gluconates, guanylates, glycerol, beta-carotene, proprionates, stearates, polyethylene glycol, fatty amides, sulfates, chlorides, acetates, benzoates, carbonates, bicarbonates, phosphates, citrates, calcium glycerophosphate, oxydes, calcic cyanamide, hydroxides, lactates, magnesium hydrocarbonate, latex, saccharose, ammonium sulfonitrate, urea, agar-agar, acids, starch, glucose, sulfur, iodine, gums, lecithines, gluten, waxes, lactose, levulose, yeasts, cellulose, cellulose derivatives, chitin, chitin derivatives and seaweeds.

16. A composition for use in the production of naturally-degradable polymer products consisting of: 5% to 85% homopolymers of polycaprolactone, 10% to 85% of polyethylene glycol, and 2% to 30% of malic acid.

17. A composition for use in the production of naturally-degradable polymer products, consisting of: 5% malic acid, 30% polyethylene glycol, 30% polycaprolactone, 10% lignin, 10% calcium carbonate, and 15% tricalcic phosphate.

* * * * *